United States Patent
Skertic et al.

[11] Patent Number: 5,187,939
[45] Date of Patent: Feb. 23, 1993

[54] RAPID COOLDOWN DEWAR

[75] Inventors: Matthew M. Skertic, Chatsworth; Joseph L. Hlava, Woodland Hills; Arthur A. Eneim; Nevil Q. Maassen, both of Goleta, all of Calif.

[73] Assignee: Hughes Aircraft Company, Los Angeles, Calif.

[21] Appl. No.: 709,929

[22] Filed: Jun. 3, 1991

[51] Int. Cl.$^5$ .............................................. F25B 19/02
[52] U.S. Cl. .................................. 62/51.2; 244/3.16; 250/352
[58] Field of Search ................ 62/51.1, 51.2, 55.5; 250/352; 244/3.16

[56] References Cited

U.S. PATENT DOCUMENTS

| | | | |
|---|---|---|---|
| 3,372,556 | 3/1968 | Waldman | 62/51.2 |
| 4,266,959 | 5/1981 | Welch | 62/55.5 |
| 4,466,252 | 8/1984 | Hood | 62/55.5 |
| 4,474,036 | 10/1984 | Ball et al. | 62/55.5 |
| 4,918,308 | 4/1990 | Neitzel et al. | 62/51.1 |

Primary Examiner—Ronald C. Capossela
Attorney, Agent, or Firm—R. M. Heald; C. D. Brown; W. K. Denson-Low

[57] ABSTRACT

A dewar (20) useful in rapidly cooling a sensor (28) supported thereon includes a bore tube assembly having a cylindrical dewar bore tube (22) with an end cap (24) at one end to close the bore tube (22). The bore tube assembly is cooled by directing a stream of coolant at the interior of the end cap (24). The sensor (28) is mounted directly to the exterior surface of the end cap (24). A cold shield (34) partially encloses the sensor (28). A cold shield support bracket (38) mounts the cold shield (34) to the cylindrical side walls of the dewar bore tube (22) at a mounting location (36) axially displaced from the end cap (24) and therefore less effectively cooled than the end cap (24), so that heat is extracted from the support bracket (38) and the cold shield (34) less rapidly than from the sensor (28). From an uncooled starting condition, the sensor (28) is cooled to its operating temperature, and the cold shield (34) is cooled to its operating temperature, in about the same time.

8 Claims, 4 Drawing Sheets

RAPID COOLDOWN DEWAR

BACKGROUND OF THE INVENTION

This invention relates to apparatus for rapidly cooling a sensor into the cryogenic temperature range, and, more particularly, to a dewar structure that supports the sensor and promotes the rapid cooling.

Many types of devices, such as infrared detectors, are operated at very low temperatures, as for example 77K or less. In some cases, low temperature operation is required because physical or chemical processes of interest occur only at low temperature, and in other cases because some types of electrical-thermal noise are reduced at low temperature. An approach to cool the device to low temperature is therefore required.

The simplest and most direct approach to cooling a device to a low operating temperature is to place the device into a bath of a liquefied gas whose normal boiling temperature is approximately the desired operating temperature. This approach is preferred in many laboratory situations, but it is not practical for the cooling of sensors in mobile applications such as missiles, or inaccessible applications such as spacecraft, where it is not possible to store liquid coolants for extended periods of time.

Rapid cooldown times without use of liquefied gases are achieved with a Joule-Thomson gas expansion cryostat. The cryostat expands a pressurized gas to form a coolant stream which may contain cold gas, liquefied gas, or both. The coolant stream absorbs heat from the surroundings and carries it away, leaving a cooled structure.

Some specialized devices and cooling systems have unique packaging and space limitations. For example, an infrared heat seeking detector in the nose of a missile must be securely supported and rapidly cooled upon demand, but the overall size and weight of the cooling system is severely limited by the overall system constraints.

Thus, while Joule-Thomson cryostat cooling offers the greatest promise for rapid cooldown of sensors and their related structure, the constraints imposed by missile sensor applications require continuing improvement in both the cryostat and the sensor packaging. There are requirements for ever-shorter cooldown times of the sensors to an operational state from an uncooled state, and there is an ongoing need for cooling techniques that achieve such reduced cooldown times while meeting space and weight requirements. The present invention fulfills this need, and further provides invention fulfills this need, and further provides related advantages.

SUMMARY OF THE INVENTION

The present invention provides a support structure for a sensor that achieves substantially shorter cooldown times from an uncooled state to an operational state, as compared with prior approaches. The dewar assembly support structure is operable in conjunction with conventional or rapid cooldown Joule-Thomson cryostats to cool an infrared sensor from the uncooled state to an operational state at about 77K in less than 10 seconds.

In accordance with the invention, a dewar assembly comprises a dewar bore tube and a dewar bore tube end cap that closes one end of the dewar bore tube. A sensor is mounted to an external surface of the dewar bore tube end cap. A cold shield partially surrounding the sensor, and a cold shield support bracket supports the cold shield from a location on the dewar bore tube displaced longitudinally along the length of the dewar bore tube from the dewar bore tube end cap.

A key to the present invention is separating the cooling path of the sensor from that of the cold shield. The sensor is fixed to the end cap, which is the most rapidly cooled portion of the dewar assembly. Other structure which does not need to be cooled as rapidly or to as low a temperature as the sensor in order to be operational is cooled by conduction to other locations on the dewar assembly from which heat is not extracted as rapidly as from the end cap.

More specifically, in conventional designs the cold shield is heat sinked to the same location as the sensor, greatly increasing the thermal mass that must be cooled. In the present approach, only the sensor is cooled by heat flow through the end cap, the most rapidly cooling part of the dewar assembly, while the cold shield is cooled through another part of the dewar assembly that does not cool as rapidly. This design approach is based upon the observation that, in order to become operational, the cold shield does not have to be cooled to as low a temperature as the sensor. In the present approach, heat extraction from the cold shield is adjusted so that the sensor and the cold shield both reach their individual operational temperatures at about the same time, the operational temperature of the sensor being considerably colder than the operational temperature of the cold shield.

The present invention therefore provides an advantage in the art of cooled sensor technology, by permitting rapid attainment of operational temperature in the sensor system. Heat extraction from different elements of structure is balanced to achieve a mutually optimized cooling performance. Other features and advantages of the invention will be apparent from the following more detailed description of the preferred embodiment, taken in conjunction with the accompanying drawings, which illustrate, by way of example, the principles of the invention.

DETAILED DESCRIPTION OF THE INVENTION

In accordance with the invention, a dewar assembly comprises a hollow cylindrical dewar bore tube, and a dewar bore tube end cap that closes one end of the dewar bore tube, the dewar bore tube end cap having an outwardly facing external surface. A sensor is mounted to the external surface of the dewar bore tube end cap. A cylindrical cold shield partially surrounding the sensor, the cold shield having a cylindrical diameter greater than that of the dewar bore tube and being made from a material selected from the group of high thermal diffusivity metals consisting of copper and aluminum and their alloys. A cold shield support bracket supports the cold shield from a location on the dewar bore tube displaced longitudinally along the length of the dewar bore tube from the dewar bore tube end cap, the cold shield support bracket including a ceramic interconnect card having electrical surface traces and upon which the cold shield is supported, and a metallic cold shield support bracket attached to a cylindrical surface of the dewar bore tube at a first end and upon which the interconnect card is supported at a second end. The attachment point of the cold shield support bracket to the cold shield is desirably selected to optimize the cooldown process.

More generally, a dewar assembly used in conjunction with a cooling system comprises heat extraction support means for extracting heat from a structure to be cooled, the heat extraction support means having a first location disposed in relation to a cooling system such that heat is extracted from the first location more rapidly than from a second location thereof. A sensor is mounted to the heat extraction support means at the first location, with a cold shield partially surrounding the sensor. A cold shield support bracket supports the cold shield from the second location on the heat extraction support means.

Figure 1:
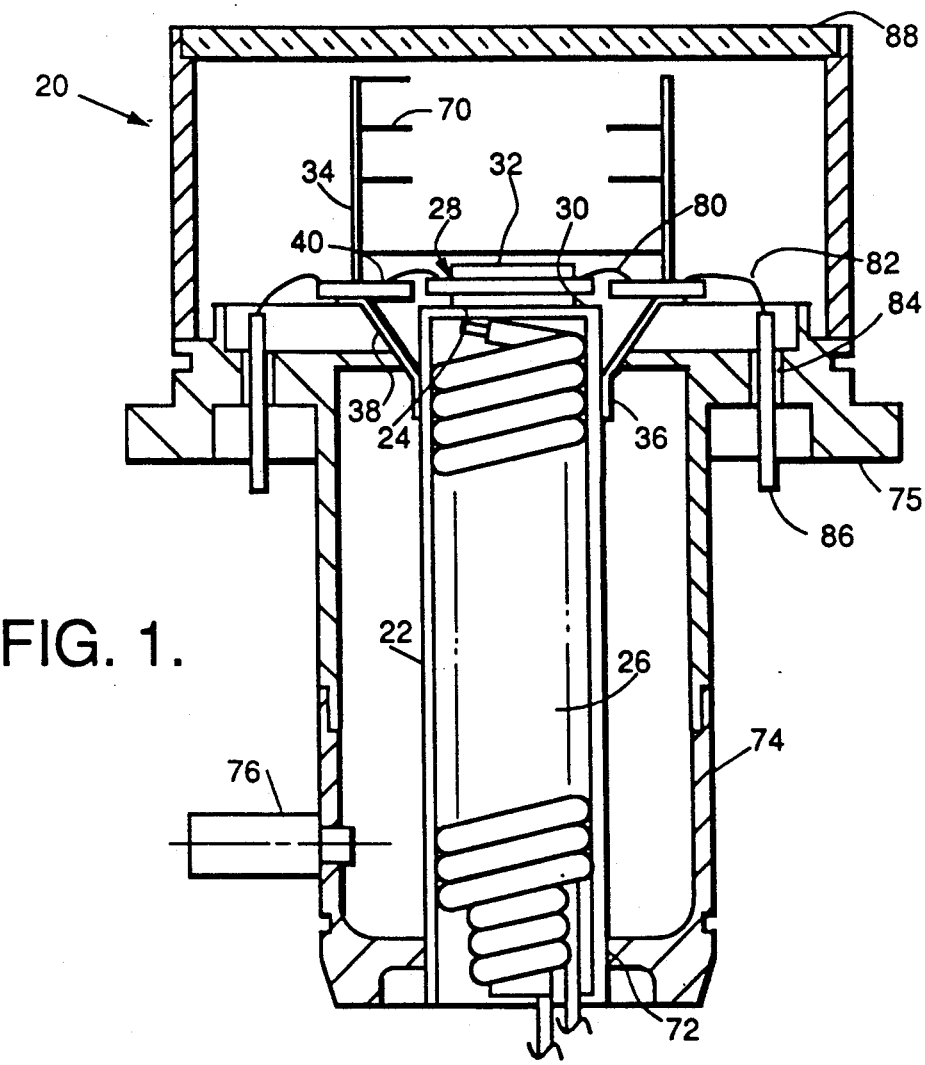
FIG. 1 is a side sectional view of a dewar assembly in accordance with the invention.

FIG. 1 depicts a dewar assembly 20 having a hollow cylindrical bore tube 22 that serves as the main conduit for heat extraction. A flat bore tube end cap 24 closes one end (the cold end) of the bore tube 22, making it gas tight. The bore tube 22 and the end cap 24 are preferably, but not necessarily, made of low conductivity material such as a nickel-iron alloy having a wall thickness of about 0.005 inches. In operation, a cooling unit 26 such as, for example, a Joule-Thomson gas expansion cryostat fits within the interior of the bore tube 22, and directs a stream of coolant at the interior of the end cap 24. The cooling unit 26 forms no part of the present invention, and is shown only for reference purposes.

A sensor 28 is supported on an external surface 30 of the end cap 24 and fixed thereto by a thin (about 0.001 inch) layer of a thermally conductive epoxy. In the presently preferred embodiment, the sensor 28 includes a plurality of silicon or mercury cadmium telluride detectors in a focal plane array (FPA) 32. The sensor 28 faces away from the bore tube 22, in a direction that is generally parallel to its cylindrical axis, and is intended to detect infrared radiation reaching the sensor 28 from locations external to the dewar assembly. The sensor must be cooled to a temperature of about 77K or less in order to become operable. A primary objective of the rapid cooldown dewar assembly 20 is to cool the sensor to its operating temperature, from an uncooled ambient starting temperature, as rapidly as possible.

A cylindrical cold shield 34 partially surrounds the sensor 28 and blocks unwanted radiation from reaching the sensor 28. Such radiation is emitted from warm sources lying off axis outside of the main optical signal cone that is collected and transmitted through the telescope region in front of the dewar. The signal bundle travels along the optical axis that coincides with the cylindrical axis of the bore tube 22 and the cold shield 34. The cold shield 34 is preferably made of copper (or copper-based alloy) or aluminum (or an aluminum-based alloy) metal that is formed or machined into a tubular configuration having a wall thickness of about 0.010 inches. The cold shield 34 is highly polished and may be gold- or silver-plated on its outside surface to reduce its radiation heat transfer from the warmer surroundings. It is generally blackened on the inside surface to reduce the number of stray light reflections.

The cold shield 34 is a necessary component, but adds thermal mass to the system that also must be cooled at the same time as the sensor 28 is cooled. One key discovery underlying the present invention is the fact that the cold shield 34 does not have to be at the same temperature as the sensor 28 in order to be effective, and in fact is effective at substantially warmer temperatures. The cold shield 34 does not emit significant amounts of radiation as long as it is at a temperature of less than about 200-220K, and therefore need not be cooled below this temperature in order to be effective.

The cold shield 34 is therefore not physically and thermally attached to the end cap 24, the location to which the sensor 28 is mounted, but instead is thermally attached to a location 36 on the bore tube 22 that is axially displaced away from the end cap 24. The cold shield 34 is mounted to the location 36 by a cold shield support bracket 38. The cold shield support bracket 38 is fixed at one end to the exterior wall of the bore tube 22 and at the other end supports a ceramic interconnect card 40 to which the cold shield 34 is fixed. The support bracket 38 is preferably made of copper (or copper alloy) or aluminum (or aluminum alloy). The support bracket 38 is preferably brazed to the bore tube 22, and its location can be established as necessary for any particular system. Fixing the support bracket closer to the end cap 24 decreases the cooling rate of the sensor 28 but increases the cooling rate of the cold shield 34.

As will be recalled, the cooling unit 26 is positioned to cool the interior of the end cap 24 more rapidly than any other location on the dewar assembly 20, because it directs a stream of coolant directly against the inside surface of the end cap 24. The cold shield mounting location 36 is therefore cooled less rapidly than the end cap 24. By mounting the cold shield 34 to the location 36, the heat load to be removed through the end cap 24 is reduced, permitting the sensor 28 mounted thereto to be cooled more rapidly, for a fixed cooling capacity of the cooling unit 26, than would also cooled through the end cap 24. The cold shield otherwise be the case if the cold shield 34 were 34 is cooled more slowly by extraction of heat through the location 36, but the slower heat extraction and consequent higher temperature reached during cooldown is acceptable because, as indicated, the cold shield 34 becomes operable for its intended purpose when it reaches 200-220K, a substantially higher temperature than the 77K required for operability of the sensor 28.

Thus, the present invention separates the heat flow cooling paths of the sensor 28 and the cold shield 34, cooling the sensor 28 at a higher rate and to a lower temperature, and cooling the cold shield 34 at a lower rate but to an acceptable operating temperature. During subsequent extended operation of the dewar assembly 20 after the initial cooldown phase, the sensor 28 is maintained at its operating temperature of 77K or less, and the cold shield 34 eventually reaches an equilibrium temperature of 100K or less. These temperatures are easily maintained, and it is the initial rapid cooldown phase to maximum operating temperatures that is shortened by the present approach.

Figure 2:
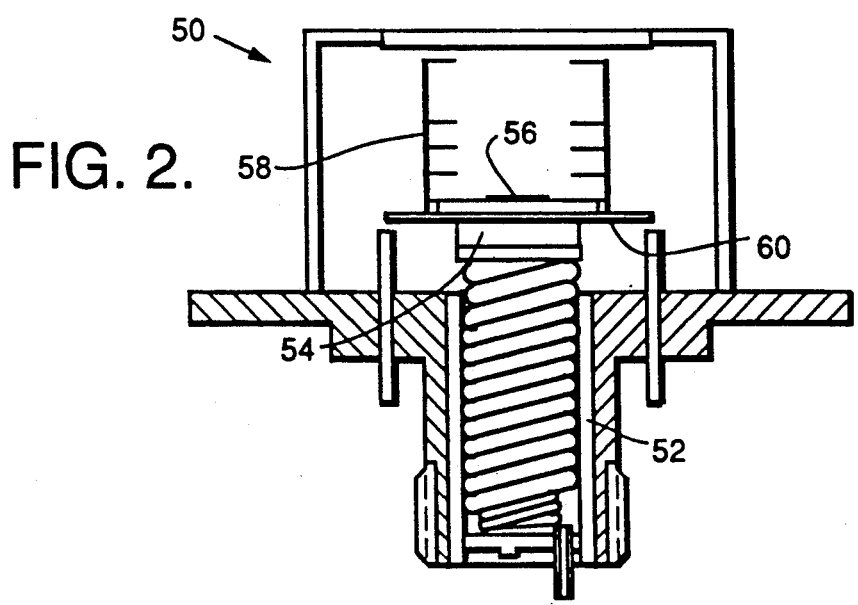
FIG. 2 is a side sectional view of a portion of a prior dewar assembly.

By way of comparison, FIG. 2 illustrates a prior approach to the construction of a dewar assembly 50. The dewar assembly includes a bore tube 52, an end cap 54, a sensor 56, and a cold shield 58 similar to those of the present dewar assembly 20. However, the sensor 56 and the cold shield 58 are commonly supported on a ceramic base 60, which in turn is adhesively fixed to the end cap 54. During cooldown, all the heat removed from the sensor 56 and the cold shield 58 flows through the relatively small area of the end cap 54. Due to the small cross sectional area and the finite thermal resistance of the ceramic base 60 and the adhesive used in bonding the ceramic base 60 to the end cap 54, there is a significant temperature differential that builds up across the interface while the heat of cooldown is being removed, impeding the final cooldown of the sensor 56. The temperature differential keeps the sensor 56 temperature artificially elevated throughout the cooldown process and produces a characteristic sensor temperature cooldown curve with a long tailoff before reaching an equilibrium temperature.

By contrast, in the present approach only the heat from the sensor 28 flows through the end cap 24, while heat from the cold shield 34 flows through the support bracket 38, so that the cross sectional area of the total flow path for heat extraction is significantly increased. The heat flux from the sensor alone is relatively small. This, together with the improvement in thermal conductance due to the large thermal conductivity of the metal end cap and elimination of one adhesive joint, provides for a minimal thermal time constant and a negligibly small temperature differential between the sensor 28 and the cryogenic cooler. The resulting characteristic sensor temperature cooldown curve is rapid and exhibits an abrupt transition to the final equilibrium temperature without any tailoff.

Moreover, in the prior approach the sensor 56 and the cold shield 58 are both cooled to the low temperature required for operation of the sensor 56, thereby increasing the thermal mass that must be cooled to the low temperature. In the present approach, the sensor 28 and the cold shield 34 are cooled only to their respective temperatures required for operation.

Returning to the description of the preferred approach of the present invention as depicted in FIG. 1, a series of baffles 70 extending radially inwardly from the cold shield 34 reduce the accessibility of stray heat to the sensor 28. These baffles 70 are a part of the cold shield 34, and are included in its thermal mass that must be cooled.

The bore tube 22 and structure supported thereon are brazed at its warm end 72 (remote from the end cap 24) to a vacuum-tight housing 74 having a mounting flange 75 for mounting to external structure. During manufacture, the bore tube 22 and its structure are sealed within the housing 74, the housing 74 is evacuated through an evacuation line 76, the evacuation line 76 is sealed, and getters 78 are fired to remove any residual gas.

Electrical communication between the sensor 28 and external instrumentation (not shown) is accomplished by extending gold-plated wires 80 from the sensor 28 to the interconnect card 40, which has a metallic trace pattern deposited upon its top surface. The electrical signals are carried through the trace pattern to bonding pads at the outer periphery of the interconnect card 40, to which are attached wires 82 that pass through vacuum feedthroughs 84 to external connection pins 86.

A window 88 is supported on the end of the housing 74 faced by the sensor 28. The window is made of a material having optimal transmittance at a wavelength of interest, which is typically in the infrared range.

The dewar assembly 20 is designed to permit rapid cooling of the sensor 28 to its operating temperature of 77K or less and the cold shield to its operating temperature of 200-220K or less in less than about 10 seconds. In the operation of the dewar assembly 20, pressurized gas flows through the cooling unit 26. The gas expands through an orifice in the cooling unit 26, absorbing heat from the surroundings. The expanded gas flows countercurrently up the cooling unit 26, which acts as a heat exchanger, and is exhausted. Within a few seconds, the gas that is then expanded through the orifice is precooled sufficiently that it liquefies, so that the coolant directed against the inside of the end cap 24 is liquefied gas. The liquefied gas evaporates, removing heat, and flows back along the bore tube 22 to cool the support bracket 38 and thence the cold shield 34. The sensor 28 in contact with the exterior surface of the end cap 24 is most rapidly cooled, and the cold shield 34 is cooled at a slower rate.

Figure 3:
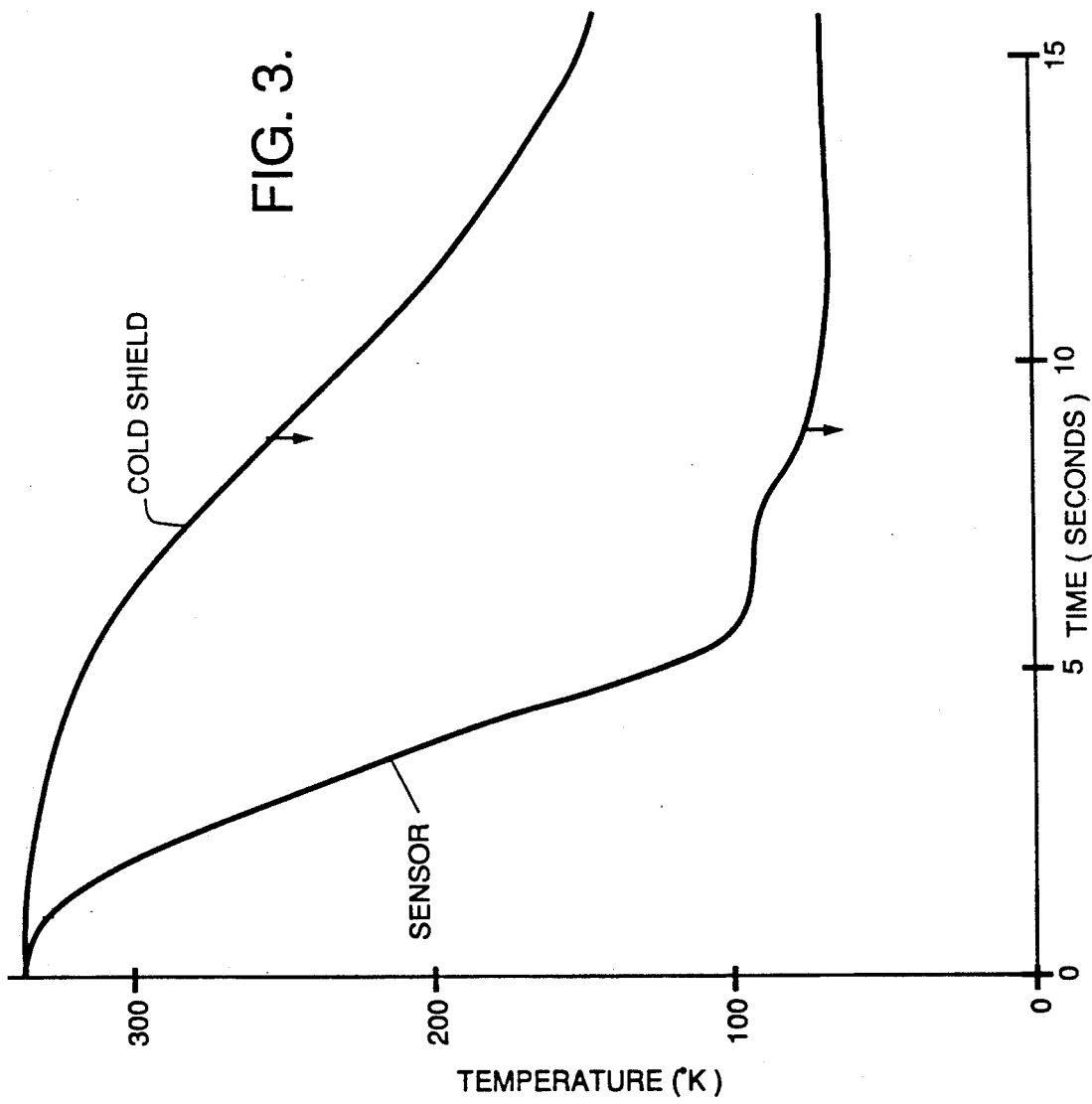
FIG. 3 is a graph of temperature as a function of time for the sensor and for the cold shield of the dewar assembly shown in FIG. 1.
Figure 4:
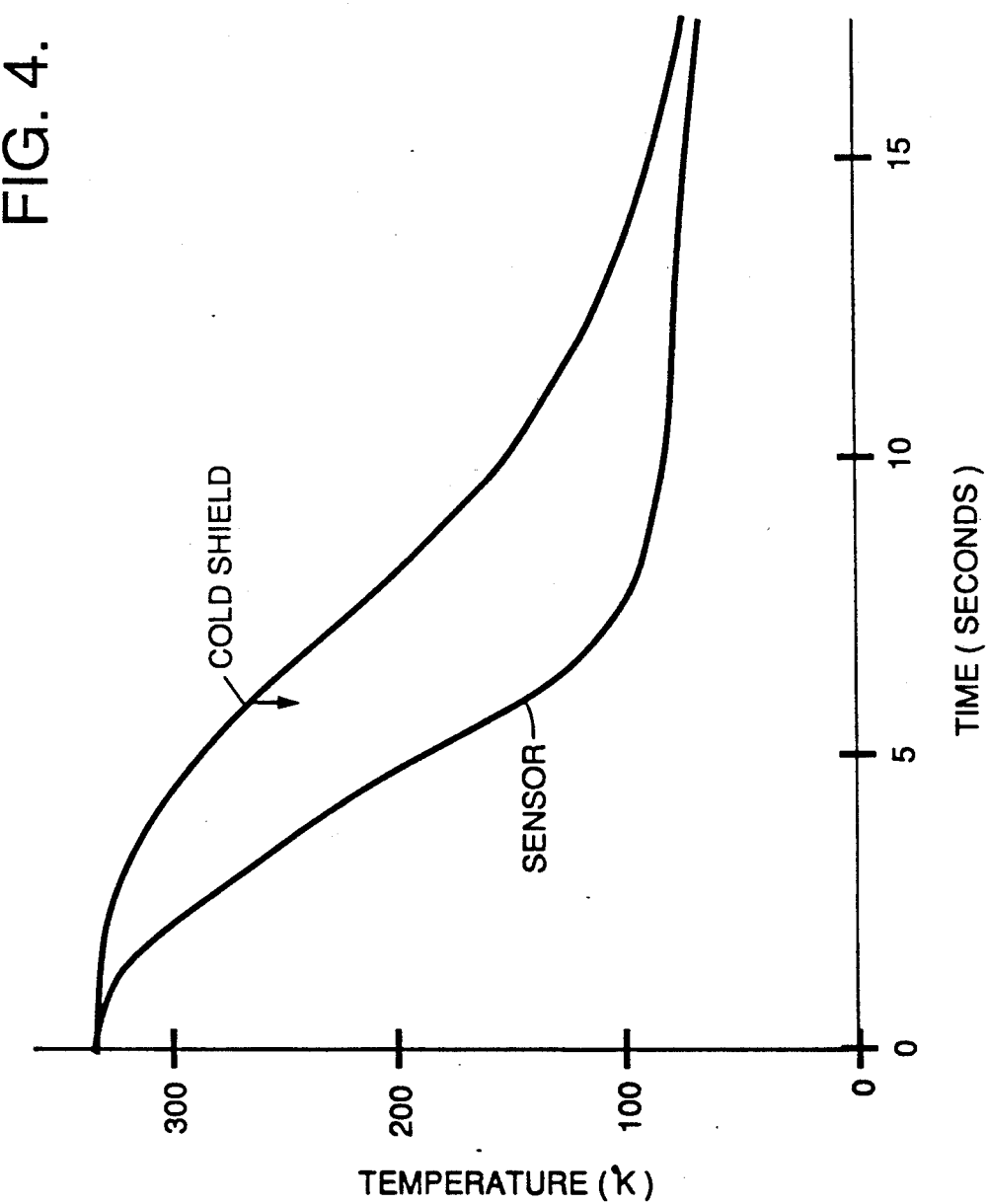
FIG. 4 is a graph of temperature as a function of time for the sensor and for the cold shield of the dewar assembly shown in FIG. 2.

A dewar assembly 20 was constructed in accordance with the approach discussed in relation to FIG. 1. The inner diameter of the bore tube 22 was 0.371 inches in this design. The cooling load of the sensor 28 was only about 70 Joules (J) in cooling from 336K to 77K, and the cold shield had a cooling load of about 135J in cooling from 336K to 220K. FIG. 3 is a graph of the temperatures of the cold shield 34 and the sensor 28 during cooldown, as measured by thermocouples that were placed into the dewar assembly 20 for the testing. In this particular set of testing conditions with the support bracket 38 attached to the bore tube 22 a distance of 0.100 inches behind the end cap 24, and starting from an initial temperature of 336K, the sensor 28 reached 77K in about 9 seconds, and the cold shield 34 reached 220K in about 10 seconds. If desired, the support bracket 38 could be moved slightly closer to the end cap to slow the cooling rate of the sensor and increase the cooling rate of the cold shield, so that they reached acceptable operating temperatures at the same moment. However, it was judged desirable to have the sensor 28 reach its operating temperature shortly prior to the cold shield reaching its operating temperature, so that the temperature of the sensor 28 could equilibrate for two seconds, thereby improving its stability. Comparative cooldown data is shown in FIG. 4 for the conventional dewar assembly 50 of FIG. 2. In a test under similar cooling conditions, the sensor 56 reached 77K in about 16.0 seconds and the cold shield 58 reached 220K in about 7.5 seconds.

Figure 5:
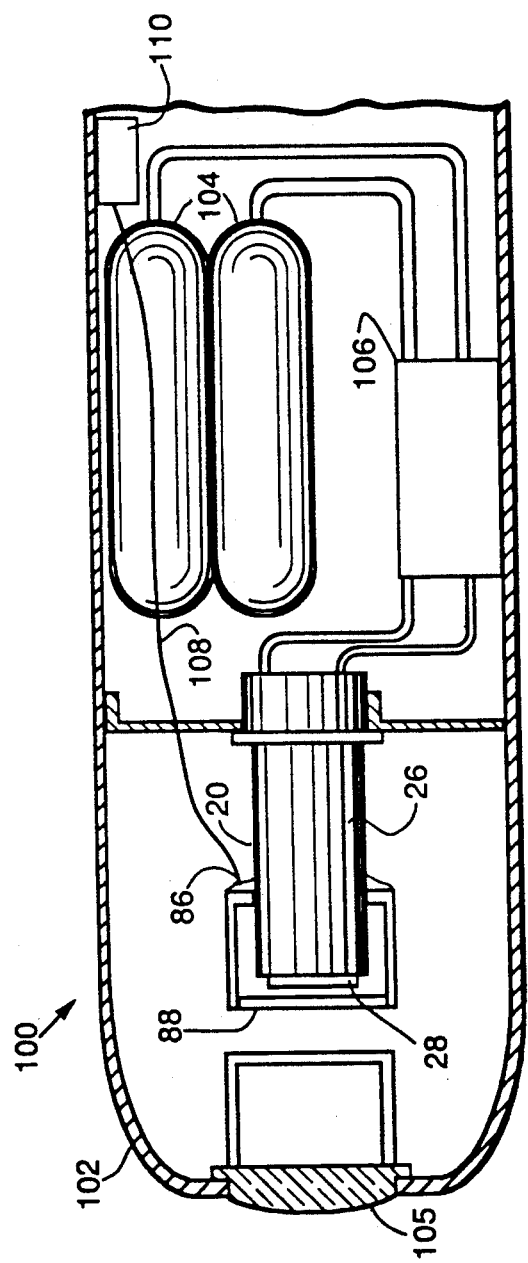
FIG. 5 is a schematic view of a missile having a sensor according to the present invention.

A preferred application of the present invention is illustrated in FIG. 5. A missile 100 has a body 102, with the dewar assembly 20 and its cooling unit 26 mounted in the forward end. The window 88 is mounted behind a telescope 105, which in turn is mounted to the body 102, permitting the sensor 28 to view the approaching scene. The pressurized gas to operate the cooling unit 26 is supplied by pressure bottles 104 whose gas flow and pressure are regulated by a regulator 106. The output signal of the sensor 28, as available at the pins 86, is transmitted on a signal line 108 to a control system 110 of the missile 100. The control system 110 provides guidance control signals to the control surfaces (not shown) of the missile 100. The dewar assembly 20 of the invention permits this missile to become operational in about 11 seconds from a warm start, by cooling the sensor 28, cold shield 34, and related structure to their respective operating temperatures much faster than was previously possible.

The present invention provides improved initial cooldown performance for a sensor and its cold shield. Although particular embodiments of the invention have been described in detail for purposes of illustration, various modifications may be made without departing from the spirit and scope of the invention. Accordingly, the invention is not to be limited except as by the appended claims.

What is claimed is: p

1. A dewar assembly, comprising:
   a dewar bore tube;
   a dewar bore tube end cap that closes one end of the dewar bore tube, the dewar bore tube end cap having an outwardly facing external surface;
   a sensor mounted to the external surface of the dewar bore tube end cap;
   a cold shield partially surrounding the sensor; and
   a cold shield support bracket that supports the cold shield, said support bracket engaging said bore tube at a location on the dewar bore tube displaced longitudinally along the length of the dewar bore tube from the dewar bore tube end cap.

2. The dewar assembly of claim 1, wherein the dewar bore tube and cold shield are cylindrical.

3. The dewar assembly of claim 1, wherein the cold shield is made of a material selected from the group of high thermal diffusivity metals consisting of copper and aluminum and their alloys.

4. The dewar assembly of claim 1, wherein the cold shield support bracket is made at least in part of a material selected from the group of high thermal diffusivity metals consisting of copper and aluminum and their alloys.

5. A dewar assembly, comprising:
   a hollow cylindrical dewar bore tube;
   a dewar bore tube end cap that closes one end of the dewar bore tube, the dewar bore tube end cap having an outwardly facing external surface;
   a sensor mounted to the external surface of the dewar bore tube end cap;
   a cylindrical cold shield partially surrounding the sensor, the cold shield having a cylindrical diameter greater than that of the dewar bore tube and being made from a material selected from the group of high thermal diffusivity metals consisting of copper and aluminum and their alloys; and
   a cold shield support bracket that supports the cold shield from a location on the dewar bore tube displaced longitudinally along the length of the dewar bore tube from the dewar bore tube end cap, the cold shield support bracket including
      a ceramic interconnect card having electrical surface traces and upon which the cold shield is supported, and
      a metallic cold shield support bracket attached to a cylindrical surface of the dewar bore tube at a first end and upon which the interconnect card is supported at a second end.

6. The dewar assembly of claim 5, wherein the dewar bore tube is made of an iron-nickel alloy with low thermal conductivity.

7. The dewar assembly of claim 5, further including an outer housing around the dewar bore tube and the cold shield.

8. A missile, comprising:
   a body;
   means for sensing the field of view forward of the missile, the means for sensing including a dewar assembly having
   a dewar bore tube,
   a dewar bore tube end cap that closes one end of the dewar bore tube, the dewar bore tube end cap having an outwardly facing external surface,
   a sensor mounted to the external surface of the dewar bore tube end cap,
   a cold shield partially surrounding the sensor, and
   a cold shield support bracket that supports the cold shield, said support bracket engaging said bore tube at a location on the dewar bore tube displaced longitudinally along the length of the dewar bore tube from the dewar bore tube end cap; and
   a cooling unit that cools the sensor and the cold shield.

* * * * *